(12) United States Patent
Patel et al.

(10) Patent No.: US 12,089,596 B2
(45) Date of Patent: Sep. 17, 2024

(54) CO-CRYSTALS OF BOSCALID AND TRIAZOLES

(71) Applicant: UPL LTD, Haldia (IN)

(72) Inventors: Rakesh Bhulabhai Patel, Mumbai (IN); Satish Ekanath Bhoge, Mumbai (IN); Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 14 days.

(21) Appl. No.: 18/157,593

(22) Filed: Jan. 20, 2023

(65) Prior Publication Data

US 2023/0157291 A1    May 25, 2023

Related U.S. Application Data

(62) Division of application No. 16/772,376, filed as application No. PCT/IB2018/060147 on Dec. 15, 2018, now Pat. No. 11,632,956.

(30) Foreign Application Priority Data

Dec. 20, 2017 (IN) .............................. 201731045819

(51) Int. Cl.
 *A01N 43/653* (2006.01)
 *A01N 25/12* (2006.01)
 *A01N 43/40* (2006.01)

(52) U.S. Cl.
 CPC .......... *A01N 43/653* (2013.01); *A01N 25/12* (2013.01); *A01N 43/40* (2013.01)

(58) Field of Classification Search
 CPC .................................................. A01N 43/653
 See application file for complete search history.

(56) References Cited

U.S. PATENT DOCUMENTS

| | | | |
|---|---|---|---|
| 2002/0040044 A1 | 4/2002 | Schlatter | |
| 2021/0076679 A1 | 3/2021 | Patel et al. | |

FOREIGN PATENT DOCUMENTS

| | | | | |
|---|---|---|---|---|
| CN | 102428931 | * | 1/2012 | ........... A01N 43/653 |
| CN | 102334482 A | | 2/2012 | |
| CN | 102428931 B | | 9/2013 | |
| CN | 106857532 | * | 6/2017 | ........... A01N 43/653 |
| CN | 106857532 A | | 6/2017 | |
| WO | 2007028387 A1 | | 3/2007 | |
| WO | 2008117037 A1 | | 10/2008 | |
| WO | 2011054741 A2 | | 5/2011 | |

OTHER PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS Registrysm) Sep. 2016 2 pages.*
International Search Report and Written Opinion for International Application PCT/IB2018/060147; International Filing Date: Dec. 15, 2018; Date of Mailing: Mar. 25, 2019; 9 pages.

* cited by examiner

*Primary Examiner* — Nizal S Chandrakumar
(74) *Attorney, Agent, or Firm* — CANTOR COLBURN LLP

(57) ABSTRACT

The present invention relates to co-crystals of boscalid and a triazole fungicide such as hexaconazole or cyproconazole. Also included are agrochemical compositions and methods of combating or controlling fungi by contacting the fungi or their locus with a fungicidally effective amount of the co-crystal.

8 Claims, 5 Drawing Sheets

CO-CRYSTALS OF BOSCALID AND TRIAZOLES

CROSS REFERENCE TO RELATED APPLICATIONS

This application is a divisional of U.S. application Ser. No. 16/772,376 filed on Jun. 12, 2020, which is a National Stage application of PCT/IB/2018/060147, filed Dec. 15, 2018, which claims the benefit of Indian Application No. 201731045819, filed Dec. 20, 2017, all of which are incorporated by reference in their entirety herein.

TECHNICAL FIELD OF THE INVENTION

The present invention relates to co-crystals of boscalid with triazoles, a process for the preparation of the same, compositions comprising the co-crystal and to a method of controlling fungi using said compositions.

BACKGROUND

Triazole fungicides are sterol demethylation inhibitors. These compounds are highly efficient broad-spectrum fungicides. Triazoles are systemic fungicides with protective, curative and eradicative action. These fungicides are used on different types of plants including field crops, fruit trees, small fruit, vegetables, and turf. These fungicides are highly effective against different fungal diseases. Due to the wide application and effective control over various fungal disease, these compounds are preferred in agricultural industry.

However, most of the triazole fungicide liquid formulations exhibit crystal growth during storage and handling. Due to fluctuations in temperature the smaller crystals of triazoles tend to form larger crystals i.e., the smaller crystals dissolve and recrystallize into larger crystals. The formation of large particles is thermodynamically favored as they are energetically more stable than the smaller ones. Hence there is problem to achieve desired storage stability in triazole formulations due to such particle size growth. Moreover, these large crystals block the spray nozzles during application of the formulation.

Various approaches have been adopted to prevent the crystal formation, e.g., use of solvents, surfactants or crystal growth inhibitors.

However, the problem of crystal formation still needs to be addressed.

WO2007028387 discloses concentrated liquid formulations comprising triazole fungicides. The solvents are selected among esters of plant oils, water-miscible polar aprotic co-solvents, water-immiscible co-solvents and surfactants to solve the problem of crystallization in triazole fungicide liquid formulations.

US2002040044 discloses the use of a tristyrylphenolethoxylate or its sulfate or phosphate, in combination with either vinylpyrrolidone homopolymer, or vinylpyrrolidone/styrene block polymer, or a hydrophilic ethylene oxide-propylene oxide block polymer, or with a mixture thereof for the prevention of crystal growth of the triazole fungicide on storage of the suspension concentrates.

However, all the crystallization inhibitors and surfactants mentioned in the prior art are expensive and not environmentally favorable.

In recent years co-crystallization is widely used technique for improving stability of pesticidal formulations. Co-crystals are defined as "solids that are crystalline materials composed of two or more molecules in the same crystal lattice". Co-crystals can be made from two or more different active ingredients or with one or more actives with other co-formers. These compounds can be formed by intermolecular forces such as hydrogen bonding, π-stacking and van der Waal's forces. Co-crystals may alter or enhance several important physico-chemical characteristics of the substances like solubility, bioavailability, stability, hygroscopicity, morphology, filtration and flow ability. These properties have a huge influence on pesticide formulation.

Boscalid is a Succinate De-Hydrogenase Inhibitor fungicide. It is a foliar fungicide, with translaminar and acropetal movement within the plant leaf, providing preventive and, in some cases, curative action. Boscalid inhibits spore germination, germ tube elongation and is also effective on all other stages of fungal development.

Surprisingly inventors of the present invention found out co-crystals of boscalid and triazoles do not exhibit crystal formation in a formulation in storage conditions.

OBJECTS OF THE INVENTION

It is an object of the invention to provide a co-crystal of boscalid with triazole.

It is an object of the invention to provide formulations comprising co-crystal of boscalid and triazole.

SUMMARY OF THE INVENTION

The present invention provides co-crystal of boscalid and a triazole.

Further it relates to a process for preparation of co-crystal of boscalid and a triazole.

The present invention further relates to agrochemical compositions comprising co-crystal of boscalid and a triazole.

In another aspect there is provided a method of using co-crystal of boscalid and a triazole for effectively controlling fungi.

DETAILED DESCRIPTION OF THE INVENTION

The inventors of the present invention surprisingly found out that boscalid forms a co-crystal with triazoles.

In the context of the present invention the term 'co-crystals' is defined as "solids that are crystalline materials composed of two or more molecules in the same crystal lattice".

The present invention provides co-crystals of boscalid and triazole.

Further there is provided a process for the preparation of co-crystal of boscalid and triazoles.

In an aspect, present invention provides agrochemical compositions comprising co-crystal of boscalid and triazoles.

In an embodiment, the triazole fungicide is selected from cyproconazole, difenoconazole, epoxiconazole, flutriafol, hexaconazole, mefentrifluconazole, prothioconazole, tebuconazole, tetraconazole and triticonazole.

Thus, in an aspect, the present invention provides co-crystal of boscalid and a triazole selected from cyproconazole, difenoconazole, epoxiconazole, flutriafol, hexaconazole, mefentrifluconazole, prothioconazole, tebuconazole, tetraconazole and triticonazole.

In another aspect, the present invention provides a process for preparation of co-crystal of boscalid and a triazole selected from cyproconazole, difenoconazole, epoxiconazole, flutriafol, hexaconazole, mefentrifluconazole, prothioconazole, tebuconazole, tetraconazole and triticonazole.

In another aspect, the present invention provides agrochemical compositions comprising co-crystal of boscalid and a triazole selected from cyproconazole, difenoconazole, epoxiconazole, flutriafol, hexaconazole, mefentrifluconazole, prothioconazole, tebuconazole, tetraconazole and triticonazole.

In another aspect, the present invention provides a method of using co-crystal of boscalid and a triazole for effectively controlling fungi, wherein the triazole is selected from cyproconazole, difenoconazole, epoxiconazole, flutriafol, hexaconazole, mefentrifluconazole, prothioconazole, tebuconazole, tetraconazole and triticonazole.

In an embodiment, the preferred triazole fungicide is tebuconazole.

Thus, in an embodiment, the present invention provides a co-crystal of boscalid and tebuconazole.

In an embodiment, the present invention provides co-crystal of boscalid and tebuconazole characterized by the co-crystal having a melting point between about 90-97° C. when measured in Differential Scanning Calorimeter.

In an embodiment, the molar ratio of boscalid and tebuconazole may vary in the range about 10:1 to 1:10, particularly from 1:3 to 3:1, especially 1:1.

In an embodiment, the molar ratio of co-crystal of boscalid and tebuconazole is 1:1.

In an embodiment, the present invention provides a process for preparation of co-crystal of boscalid and tebuconazole.

In another embodiment, the present invention provides an agrochemical composition comprising co-crystal of boscalid and tebuconazole.

In another embodiment, there is provided a method of using co-crystal of boscalid and tebuconazole for effectively controlling fungi.

In an embodiment, the present invention provides a co-crystal of boscalid and hexaconazole.

In another embodiment, the present invention provides co-crystal of boscalid and hexaconazole characterized by the co-crystal having a melting point between 101-105° C. when measured in Differential Scanning Calorimeter.

In an embodiment, the molar ratio of boscalid and hexaconazole in the co-crystal may vary in the range about 10:1 to 1:10, particularly from 1:3 to 3:1, especially 1:1.

In a preferred embodiment, the co-crystal structures described herein comprise boscalid and hexaconazole in about 1:1 molar ratio.

In an embodiment, the present invention provides a co-crystal of boscalid and cyproconazole.

In an embodiment, the present invention provides co-crystal of boscalid and cyproconazole characterized by the co-crystal having a melting point between 97-101° C. when measured in Differential Scanning Calorimeter.

In an embodiment, the molar ratio of boscalid and cyproconazole may vary in the range about 10:1 to 1:10, particularly from 1:3 to 3:1, especially 1:1.

In a preferred embodiment, the co-crystal structures described herein comprise boscalid and cyproconazole in about 1:1 molar ratio.

In an embodiment of the present invention the co-crystal of boscalid and a triazole can be obtained by any conventional process known to the person skilled in the art used to prepare such co-crystals.

The co-crystal of boscalid and a triazole can be prepared by solution crystallization, dry grinding, and solvent drop grinding technique.

In an embodiment, the present invention provides a process for the preparation of co-crystal of boscalid and a triazole comprising:
 a) preparing a concentrated solution of boscalid and a triazole in a one or more solvents;
 b) triturating or precipitating with an anti-solvent to obtain the co-crystal.

In another embodiment, the present invention provides a process for the preparation of co-crystal of boscalid and a triazole comprising:
 a) preparing a concentrated solution of boscalid and a triazole in a one or more solvents;
 b) optionally evaporating the solvent;
 c) triturating or precipitating with an anti-solvent to obtain the co-crystal.

According to an embodiment the solvent can be selected from aliphatic alcohols, ketones, esters, ethers, polar protic solvents, polar aprotic solvents, halogenated solvents, aliphatic hydrocarbon, and aromatic hydrocarbon.

According to an embodiment the solvent can be selected from methanol, ethanol, isopropyl alcohol, acetone, dichloromethane, dichloroethane, dichloropropane, trichloroethane, chloroform, and ethyl acetate.

In an embodiment of the present invention the anti-solvent can be aliphatic or aromatic hydrocarbon.

In an embodiment in step (b) the solvent is partially evaporated.

In an embodiment in step (b) the solvent is completely evaporated.

In a preferred embodiment of the present invention, the anti-solvent is selected from n-hexane, n-heptane, diethyl ether, petroleum ether, 1,4-dioxane, cyclohexanone, toluene or xylene.

In another embodiment, the process for preparation of co-crystal of boscalid and a triazole comprises:
 a) dissolving boscalid and a triazole in a suitable solvent;
 b) altering the temperature to produce the co-crystal.

According to an embodiment the solvent can be selected from aliphatic alcohols, ketones, esters, ethers, polar protic solvents, polar aprotic solvents, halogenated solvents, aliphatic hydrocarbon, and aromatic hydrocarbon.

According to an embodiment, the solvent can be selected from methanol, ethanol, isopropyl alcohol, acetone, dichloromethane, dichloroethane, dichloropropane, trichloroethane, chloroform, and ethyl acetate.

In a preferred embodiment of the present invention, the solvent is selected from dichloromethane or dichloroethane.

In another aspect of the present invention, the co-crystal of boscalid and a triazole may be prepared by grinding together boscalid and the triazole. The process comprises:
 a) admixing boscalid and a triazole;
 b) optionally admixing solvent to the mixture; and
 c) grinding or crushing or milling the mixture to obtain the co-crystal.

According to an embodiment, the solvent can be selected from aliphatic alcohols, ketones, esters, ethers, polar protic solvents, polar aprotic solvents, halogenated solvents, aliphatic hydrocarbon, and aromatic hydrocarbon.

According to an embodiment, the solvent can be selected from methanol, ethanol, isopropyl alcohol, acetone, dichloromethane, dichloroethane, dichloropropane, trichloroethane, chloroform, and ethyl acetate.

In an embodiment, the present invention provides agrochemical composition comprising a co-crystal of boscalid and a triazole.

In an embodiment of the present invention, there is provided an agrochemical composition comprising the co-crystal of boscalid and a triazole along with other agronomically acceptable excipients.

In an embodiment of the present invention the process of adding the ingredients/and or other pesticides can be in any order.

The agrochemical compositions comprising the co-crystal of boscalid and a triazole can be dispersible granules, wettable powders, soluble powders, dry flowables, emulsion, dispersion, suspension concentrate, encapsulation in polymeric materials, oil dispersions, emulsifiable concentrate, soluble liquid concentrate, micro emulsions, flow able concentrate, or suspo-emulsion. These formulations are produced in a known manner for example by mixing the co-crystal of boscalid and a triazole with auxiliaries suitable for the formulation of these active ingredients such as solvents/carriers, optionally with adjuvants such as surfactants, emulsifiers, dispersing agents, anti-foaming agents, anti-freezing agents, colorants, wetting agents, anticaking agents, biocides, viscosity modifiers and binding agents. The composition content of these adjuvants is not particularly limiting and may be determined by a skilled technician in the art according to the conventional protocols.

In an embodiment of the present invention, the surfactants that can be additionally added to the compositions are selected from nonionic and/or anionic surfactants.

Examples of nonionic surfactants comprise alkylphenol alkoxylates, alcohol alkoxylates, fatty amine alkoxylates, polyoxyethylene glycerol fatty acid esters, castor oil alkoxylates, fatty acid alkoxylates, fatty amide alkoxylates, fatty polydiethanolamides, lanolin ethoxylates, fatty acid polyglycol esters, isotridecyl alcohol, fatty amides, methylcellulose, fatty acid esters, alkyl polyglycosides, glycerol fatty acid esters, polyethylene glycol, polypropylene glycol, polyethylene glycol/polypropylene glycol block copolymers, polyethylene glycol alkyl ethers, polypropylene glycol alkyl ethers, polyethylene glycol/polypropylene glycol ether block copolymers (polyethylene oxide/polypropylene oxide block copolymers) and mixtures thereof. Preferred nonionic surfactants are fatty alcohol ethoxylates, alkyl polyglycosides, glycerol fatty acid esters, castor oil alkoxylates, fatty acid alkoxylates, fatty amide alkoxylates, lanolin ethoxylates, fatty acid polyglycol esters and ethylene oxide/propylene oxide block copolymers and mixtures thereof.

Examples of anionic surfactants include alkylaryl sulfonates, phenyl sulfonates, alkyl sulfates, alkyl sulfonates, aryl alkyl sulfonates, alkyl ether sulfates, alkylaryl ether sulfates, alkyl polyglycol ether phosphates, polyaryl phenyl ether phosphates, alkyl sulfosuccinates, olefin sulfonates, paraffin sulfonates, petroleum sulfonates, taurides, sarcosides, salts of fatty acids, alkylnaphthalenesulfonic acids, naphthalenesulfonic acids and lignosulfonic acids, condensates of sulfonated naphthalenes with formaldehyde or with formaldehyde and phenol and, if appropriate, urea, and also condensates of phenolsulfonic acid, formaldehyde and urea, lignosulfite waste liquors and lignosulfonates, alkyl phosphates, alkylaryl phosphates, for example tristyryl phosphates, and also polycarboxylates, such as, for example, polyacrylates, maleic anhydride/olefin copolymers, including the alkali metal, alkaline earth metal, ammonium and amine salts of the substances mentioned above and mixtures thereof. Preferred anionic surfactants are those which carry at least one sulfonate group, and in particular their alkali metal and their ammonium salts and mixtures thereof.

In an embodiment of the present invention, solvents suitable for use in the compositions of the present invention include water, aromatic solvents (for example Solvesso products, xylene, mix-xylene), alcohols (for example methanol, butanol, pentanol, benzyl alcohol), ketones (for example cyclohexanone, gamma-butyrolactone), pyrrolidones (NMP, NOP), ketonic solvents, glycols, acetates (glycol diacetate), carbonates such as propylene carbonates, fatty acid dimethylamides (for example N, N dimethyl octanamide, N, N dimethyl decanamide, Hallcomid, rhodiasolv adma10, fatty acids fatty acid esters and amino carboxylic acid esters (polarclean). In principle, solvent mixtures can also be used.

In an embodiment the compositions of the present invention comprise a crystallisation inhibitor which is usually employed for this purpose in agrochemical compositions.

In an embodiment of the present invention, the compositions comprise rheology modifier (or a viscosity modifying additive or a structuring agent). Suitable compounds are all those compounds usually employed for this purpose in agrochemical compositions. Examples include bentonites, attapulgites, polysaccharides, such as xanthan gum and kelzan gum.

In another embodiment of the present invention, the compositions comprise antifreeze agents. Suitable antifreeze agents are liquid polyols, for example ethylene glycol, propylene glycol or glycerol.

Common surface-active substances present in formulations of agrochemical active ingredients are suitable for use as emulsifiers. Examples are ethoxylated nonylphenols, polyethylene glycol ethers of linear alcohols, conversion products of alkylphenols with ethylene oxide and/or propylene oxide, ethylene oxide-propylene oxide block copolymers, polyethylene glycols and polypropylene glycols (Emulsogen PC), furthermore fatty acid esters, alkyl sulphonates, alkyl sulphates, aryl sulphates, ethoxylated arylalkylphenols, such as tristyryl-phenol-ethoxylate, furthermore ethoxylated and propoxylated arylalkylphenols as well as sulphated or phosphated arylalkylphenol-ethoxylates or -ethoxy- and -propoxylates.

In yet another embodiment of the present invention, the compositions comprise dispersing agents. All substances commonly used as dispersing agents in plant protection products are suitable for this purpose. Preferred dispersants are of anionic or nonionic nature and selected, for example, from polyethylene glycol/polypropylene glycol block copolymers, polyethylene glycol alkyl ethers, polypropylene glycol alkyl ethers, polyethylene glycol/polypropylene glycol ether block copolymers, alkylaryl phosphates, for example tristyryl phosphates, lignosulfonic acids, condensates of sulfonated naphthalenes with formaldehyde or with formaldehyde and phenol and, if appropriate, urea, and also condensates of phenolsulfonic acid, formaldehyde and urea, lignosulfite waste liquors and lignosulfonates, polycarboxylates, such as, for example, polyacrylates, maleic anhydride/olefin copolymers including the alkali metal, alkaline earth metal, ammonium and amine salts of the substances mentioned above.

In another embodiment of the present invention, the compositions comprise wetting agents. Preferred wetting agents are of anionic or nonionic nature and selected, for example, from naphthalenesulfonic acids including their alkali metal, alkaline earth metal, ammonium and amine salts, fatty alcohol ethoxylates, alkyl polyglycosides, glycerol fatty acid esters, castor oil alkoxylates, fatty acid alkoxylates, fatty amide alkoxylates, fatty polydiethanolamides, lanolin ethoxylates and fatty acid polyglycol esters.

In an embodiment of the present invention the compositions comprise a humectant selected from polyols like sucrose, glycerin or glycerol, triethylene glycol, tripropylene glycol, and propylene glycol.

In an embodiment there is provided a process for the preparation of compositions comprising of co-crystal of boscalid and a triazole and agronomically acceptable excipients. The process for preparing such compositions is not particularly limiting.

In an embodiment of the present invention, the composition of co-crystal of boscalid and a triazole is be prepared by a process comprising:
  a) mixing boscalid and a triazole with at least one agronomically acceptable excipient;
  b) Optionally adding one or more other pesticides;
  c) Optionally grinding and pulverizing; and
  d) granulating said mixture to obtain granular composition.

In a preferred embodiment of the present invention, the agrochemical composition comprises from about 0.1% to about 100% by weight of the co-crystal of boscalid and a triazole.

The step of granulating the mixture is not particularly limiting. Appropriate granulating processes are all conventional processes described in granulating technology for example spray drying, fluidized bed granulation, agglomeration, pan granulation and in particular extrusion granulation.

The co-crystal of boscalid and a triazole can be combined with one or more other pesticides to form agrochemical compositions.

In an embodiment, the composition comprises administering the co-crystal of boscalid and a triazole along with one or more other pesticides.

In an embodiment, the one or more pesticide may be selected from:
  a) herbicides selected from a isoxazolidinone herbicide, a urea herbicide, a triazine herbicide, a hydroxybenzonitrile herbicide, a thiocarbamate herbicide, a pyridazine herbicide, chloroacetanilide herbicides; benzothiazole herbicides; carbanilate herbicides, cyclohexene oxime herbicides; picolinic acid herbicides; pyridine herbicides; quinolinecarboxylic acid herbicides; chlorotriazine herbicides, aryloxyphenoxypropionic herbicides, oxadiazolone herbicides; phenylurea herbicides, sulfonanilide herbicides; triazolopyrimidine herbicides, amide herbicides, pyridazine herbicides, dinitroaniline herbicides or combinations thereof;
  b) fungicides selected from amide fungicides, acylamino acid fungicides, anilide fungicides, benzamide fungicides, sulfonamide fungicides, strobilurin fungicides, aromatic fungicides, benzimidazole fungicides, carbamate fungicides, carbanilate fungicides, conazole fungicides (imidazoles triazoles), copper fungicides, dithiocarbamate fungicides, imidazole fungicides, organophosphorus fungicides, oxazole fungicides, pyrazole fungicides, pyridine fungicides or combinations thereof; and
  c) insecticides selected from arsenical insecticides, botanical insecticides, carbamate insecticides, benzofuranyl methylcarbamate insecticides, dimethylcarbamate insecticides, insecticides, dinitrophenol insecticides, fluorine insecticides, formamidine insecticides, fumigant insecticides, inorganic insecticides, insect growth regulators, benzoylphenylurea chitin synthesis inhibitors, macrocyclic lactone insecticides, neonicotinoid insecticides, nereistoxin analogue insecticides, organochlorine insecticides, organophosphorus insecticides, organothiophosphate insecticides, heterocyclic organothiophosphate insecticides, phenyl organothiophosphate insecticides, phosphonate insecticides, phosphonothioate insecticides, phosphoramidate insecticides, phosphoramidothioate insecticides, phosphorodiamide insecticides, oxadiazine insecticides, oxadiazolone insecticides, phthalimide insecticides, physical insecticides, pyrazole insecticides, pyrethroid insecticides, pyrethroid ether insecticides, pyrimidinamine insecticides, pyrrole insecticides, quaternary ammonium insecticides, sulfoximine insecticides, tetramic acid insecticides, tetronic acid insecticides, thiazole insecticides, thiazolidine insecticides and thiourea insecticides.

The co-crystal of boscalid and a triazole of the present invention is suitable for combating or controlling fungi. Accordingly, there is provided a method of combating or controlling fungi, the method comprising contacting fungi or their locus with a fungicidally effective amount of co-crystal of boscalid and a triazole.

In an embodiment, the agrochemical compositions of the invention can be used to control various fungi species for example, *Cochliobolus sativus, Erysiphe graminis, Leptosphaeria nodorum, Puccinia* spp., *Pyrenophora* spp., *Rhynchosporium secalis, Septoria* spp, *Rhizoctonia solani, Helminthosporium oryzae, Hemileia vastatrix, Cercospora* spp., *Monilinia* spp., *Podosphaera* spp., *Sphaerotheca* spp., *Tranzschelia* spp., *Alternaria* spp., *Aphanomyces* spp., *Ascochyta* spp., *Bipolaris* and *Drechslera* spp., *Blumeria graminis* spp., *Botrytis cinerea, Botryodiplodia* spp., *Bremia lactucae, Corynespora* spp., *Colletotricum* spp., *Curvularia* spp., *Diplodia* spp., *Exserohilum* spp., *Fusarium* spp., *Verticillium* spp., *Gaeumanomyces Gibberella* spp., *Macrophomina* spp., *Michrodochium* spp, *Mycosphaerella* spp., *Phaeoisaripsis* spp. *Phakopsara* spp., *Phoma* spp., *Phytophthora* spp., *Plasmopara viticola, Penecilium* spp., *Pseudocercosporella herpotrichoides* spp., *Pseudoperonospora* spp., *Pyricularia oryzae, Corticium sasakii, Sarocladium oryzae, S. attenuatum, Entyloma oryzae, Pyriculana grisea, Pythium* spp., *Thievaliopsis* spp., *Tilletia* spp., *Ustilago* spp., *Venturia* spp.

The agrochemical compositions of the present invention are suitable for controlling such disease on a number of plants and their propagation material including, but not limited to the following target crops: cereals (wheat, barley, rye, oats, maize (including field corn, pop corn and sweet corn), rice, sorghum and related crops); beet (sugar beet and fodder beet); leguminous plants (beans, lentils, peas, soybeans); oil plants (rape, mustard, sunflowers); cucumber plants (marrows, cucumbers, melons); fibre plants (cotton, flax, hemp, jute); vegetables (spinach, lettuce, asparagus, cabbages, carrots, eggplants, onions, pepper, tomatoes, potatoes, paprika, okra); plantation crops (bananas, fruit trees, rubber trees, tree nurseries), ornamentals (flowers, shrubs, broad-leaved trees and evergreens, such as conifers); as well as other plants such as vines, bushberries (such as blueberries), caneberries, cranberries, peppermint, rhubarb, spearmint, sugar cane and turf grasses including, but not limited to, cool-season turf grasses (for example, bluegrasses (*Poa* L.), such as Kentucky bluegrass (*Poa pratensis* L.), rough bluegrass (*Poa trivialis* L.), Canada bluegrass (*Poa compressa* L.) and annual bluegrass (*Poa annua* L.); bentgrasses (*Agrostis* L.), such as creeping bentgrass (*Agrostis palustris* Huds.), colonial bentgrass (*Agrostis tenius* Sibth.), velvet bentgrass (*Agrostis canina* L.) and redtop (*Agrostis alba* L.); fescues (*Festuca* L.), such as tall fescue (*Festuca arundi-* nacea Schreb.), meadow fescue (*Festuca elatior* L.) and fine fescues such as creeping red fescue (*Festuca rubra* L.), chewings fescue (*Festuca rubra* var. *commutata* Gaud.), sheep fescue (*Festuca ovina* L.) and hard fescue (*Festuca longifolia*); and ryegrasses (*Lolium* L.), such as perennial ryegrass (*Lolium perenne* L.) and annual (Italian) ryegrass (*Lolium multiflorum* Lam.)) and warm-season turf grasses (for example, Bermudagrasses (Cynodon L. C. Rich), including hybrid and common Bermudagrass; Zoysiagrasses (*Zoysia Willd.*), St. Augustinegrass (*Stenotaphrum secundatum* (Walt.) Kuntze); and centipedegrass (*Eremochloa ophiuroides* (Munro.) Hack.).

The methods of application of present invention can be of either a pre-mix or tank mix of active ingredients with auxiliaries suitable for the formulation or it can be a sequential application of one after the other.

The present invention will now be described by way of the following non-limiting examples and figures.

The invention shall now be described with reference to the following specific examples. It should be noted that the examples appended below illustrate rather than limit the invention and that those skilled in the art will be able to design many alternative embodiments without departing from the scope of the present invention.

Example 1: Preparation of the Co-Crystal of Boscalid and Tebuconazole of the Present Invention by Crystallization and Precipitation by Anti-Solvent 300.0 g of boscalid and 270.0 g of tebuconazole were charged into a glass kettle. To this mixture was added 2992 g of dichloroethane. The slurry was heated to 40-45° C. for 10 to 12 hours. Solvent was evaporated under reduced pressure at 40-45° C. Hexane (400.0 g) was added to the reduced mass and the mixture was stirred for 30 min at 30-35° C., to precipitate the product. The precipitated product was filtered and dried to obtain 566 g of white solid. The melting point of solid as recorded by DSC exhibits endothermic peak at 90.01° C.

The compound was analysed by HPLC for determining the molar ratio of boscalid and tebuconazole in the co-crystal (FIG. 5).

The molar ratio of boscalid:tebuconazole in the co-crystal is found to be 50.58:48.92.

Example 2: Preparation of the Co-Crystal of Boscalid and Hexaconazole of the Present Invention by Crystallization and Precipitation by Anti-Solvent 20.0 g of boscalid and 18.0 g of hexaconazole were charged into a glass kettle. To this mixture was added 200 g of dichloroethane. The slurry was heated to 40-45° C. for 10 to 12 hours. Solvent was evaporated under reduced pressure at 40-45° C. Hexane (100.0 g) was added to the reduced mass and the mixture was stirred for 30 min at 30-35° C., to precipitate the product. The precipitated product was filtered and dried to obtain 37.2 g of white solid. The melting point of solid as recorded by DSC exhibits endothermic peak at 103.4° C.

Example 3: Preparation of the Co-Crystal of Boscalid and Cyproconazole of the Present Invention by Crystallization and Precipitation by Anti-Solvent 20.0 g of boscalid and 17.0 g of cyproconazole were charged into a glass kettle. To this mixture was added 200.0 g of dichloroethane. The slurry was heated to 40-45° C. for 10 to 12 hours. Solvent was evaporated under reduced pressure at 40-45° C. Hexane (100.0 g) was added to the reduced mass and the mixture was stirred for 30 min at 30-35° C., to precipitate the product. The precipitated product was filtered and dried to obtain 36.1 g of white solid. The melting point of solid as recorded by DSC exhibits endothermic peak at 99.03° C.

Example 4: Preparation of the Co-Crystal of Boscalid and Tebuconazole of the Present Invention by Crystallization from Dichloroethane and Evaporation of Solvent 300.0 g of boscalid and 270.0 g of tebuconazole were taken into a glass kettle. To this mixture was added 2992 g of dichloroethane, the slurry was heated to 40-45° C. for 10 to 12 hours. Solvent was evaporated under reduced pressure at 40-45° C. to obtain 564.4 g of white solid. The melting point of solid as recorded by DSC exhibits endothermic peak at 90.6° C.

Example 5: Preparation of the Co-Crystal of Boscalid and Tebuconazole of the Present Invention by Neat Grinding 300.0 g of boscalid and 270.0 g of tebuconazole were charged in an electric grinder. The mixture was grinded for 5 min at room temperature to obtain 567.5 g of white solid. The melting point of solid as recorded by DSC exhibits endothermic peak at 96.75° C.

Example 6: Preparation of the Co-Crystal of Boscalid and Tebuconazole of the Present Invention by Solvent Drop Grinding Technique 1.11 g of boscalid and 1.0 g of tebuconazole were weighed and transferred into a mortar. The solids were wetted with 100 µL of methanol, and hand-ground with a pestle until a dried solid crystalline mass was obtained. The melting point of the solid as recorded by DSC exhibits endothermic peak at 95.72° C.

Example 7: Preparation of the Co-Crystal of Boscalid and Tebuconazole of the Present Invention in Formulation Composition Boscalid, tebuconazole, sodium lignosulphonate and kaolin were weighed and manually mixed. This mixture was air jet milled up to desired particle size. The mixture was kneaded to dough by adding demineralized water. The dough was extruded on screw extruder and dried at 55° C. in fluid bed dryer up to moisture content below 1.5%.

TABLE 1

BOSCALID AND TEBUCONAZOLE WATER DISPERSIBLE GRANULE COMPOSITION

| Sr. No. | Material | % w/w |
|---|---|---|
| 1. | Boscalid | 35.02 |
| 2. | Tebuconazole | 31.73 |
| 3. | Sodium lignosulphonate | 21.00 |
| 4. | Kaolin, QS | 13.25 |
| | Total | 100.00 |

The differential thermal analysis thermogram of the formulation exhibited endothermic peak at 94.5° C.

Example 8: SC Formulation of Co-Crystal of Boscalid and Tebuconazole

Co-crystal of boscalid and tebuconazole, sulfonated aromatic polymer sodium salt, propylene glycol, silicon defoamer were taken in a beaker and kept under homogenizer to form homogenous slurry. This slurry was jet milled with dyno mill up to desired particle size. Xanthan gum was added to this wet milled slurry under homogenization. The slurry was stirred till it formed homogeneous suspension concentrate.

TABLE 2

COMPOSITION OF BOSCALID AND TEBUCONAZOLE 44.08% SUSPENSION CONCENTRATE

| Sr. No. | Material | % w/w |
| --- | --- | --- |
| 1. | Co-crystal of boscalid and tebuconazole | 44.08 |
| 2. | Sulfonated aromatic polymer, sodium salt | 7.00 |
| 3. | Propylene glycol | 5.00 |
| 4. | Silicon Defoamer | 0.55-1.05 |
| 5. | Xanthan Gum | 0.2-0.4 |
| 6. | Demineralized Water, QS | 42.47-43.17 |
| | Total | 100.00 |

Example 9: Tebuconazole SC Formulation (Comparative Example)

Tebuconazole, sulfonated aromatic polymer sodium salt, propylene glycol, silicon defoamer were taken in a beaker and kept under homogenizer to form homogenous slurry. This slurry was jet milled with dyno mill up to desired particle size. Xanthan gum was added to this wet milled slurry under homogenization. The slurry was stirred till it forms homogeneous suspension concentrate.

TABLE 3

COMPOSITION FOR TEBUCONAZOLE 38.7% SC

| Sr. No. | Material | % w/w |
| --- | --- | --- |
| 1. | Tebuconazole | 39.89 |
| 2. | Sulfonated aromatic polymer, sodium salt | 3.50 |
| 3. | Propylene glycol | 5.00 |
| 4. | Silicon defoamer | 0.55-1.05 |
| 5. | Xanthan Gum | 0.2-0.4 |
| 6. | Demineralized Water, QS | 50.16-50.86 |
| | Total | 100.00 |

Example 10: Particle Size Distribution Study

The particle size distribution was studied for SC formulation of boscalid tebuconazole co-crystal (Example 8) and SC formulation of tebuconazole (Example 9). The dispersion of boscalid and tebuconazole SC was analyzed by laser particle size analyzer (Malvern Mastersizer 2000SM) on a 100-fold dilution in water as given in Table 4 to measure the particle size distribution. The sample was kept for 14 days at elevated temperature. After completion of 14 days the particle size distribution were measured.

In similar manner dispersion of tebuconazole SC were analyzed to measure particle size distribution. The results are given in Table 4.

TABLE 4

PARTICLE SIZE DISTRIBUTION STUDY OF TEBUCONAZOLE SUSPENSION CONCENTRATE FORMULATION AND BOSCALID TEBUCONAZOLE SC FORMULATION

Particle size in micron

| Particle size distribution | At ambient temperature on 0 day | At 54° C. on 14$^{th}$ day | At ambient temperature on 0 day | At 54° C. on 14$^{th}$ day |
| --- | --- | --- | --- | --- |
| | Boscalid tebuconazole SC | | Tebuconazole SC | |
| $d_{50}$ | 2.073 | 2.265 | 1.950 | 3.615 |
| $d_{90}$ | 3.611 | 4.215 | 3.321 | 9.572 |

Particle size of boscalid and tebuconazole co-crystal dispersion was not increased significantly after 14 days at elevated temperature as compared with tebuconazole dispersion. Hence it is concluded that crystal growth in tebuconazole suspension concentrate formulation during storage is controlled by co-crystal of boscalid and tebuconazole as comprehended from the results described in Table 4.

DESCRIPTION OF THE ACCOMPANYING DRAWINGS

Figure 1:
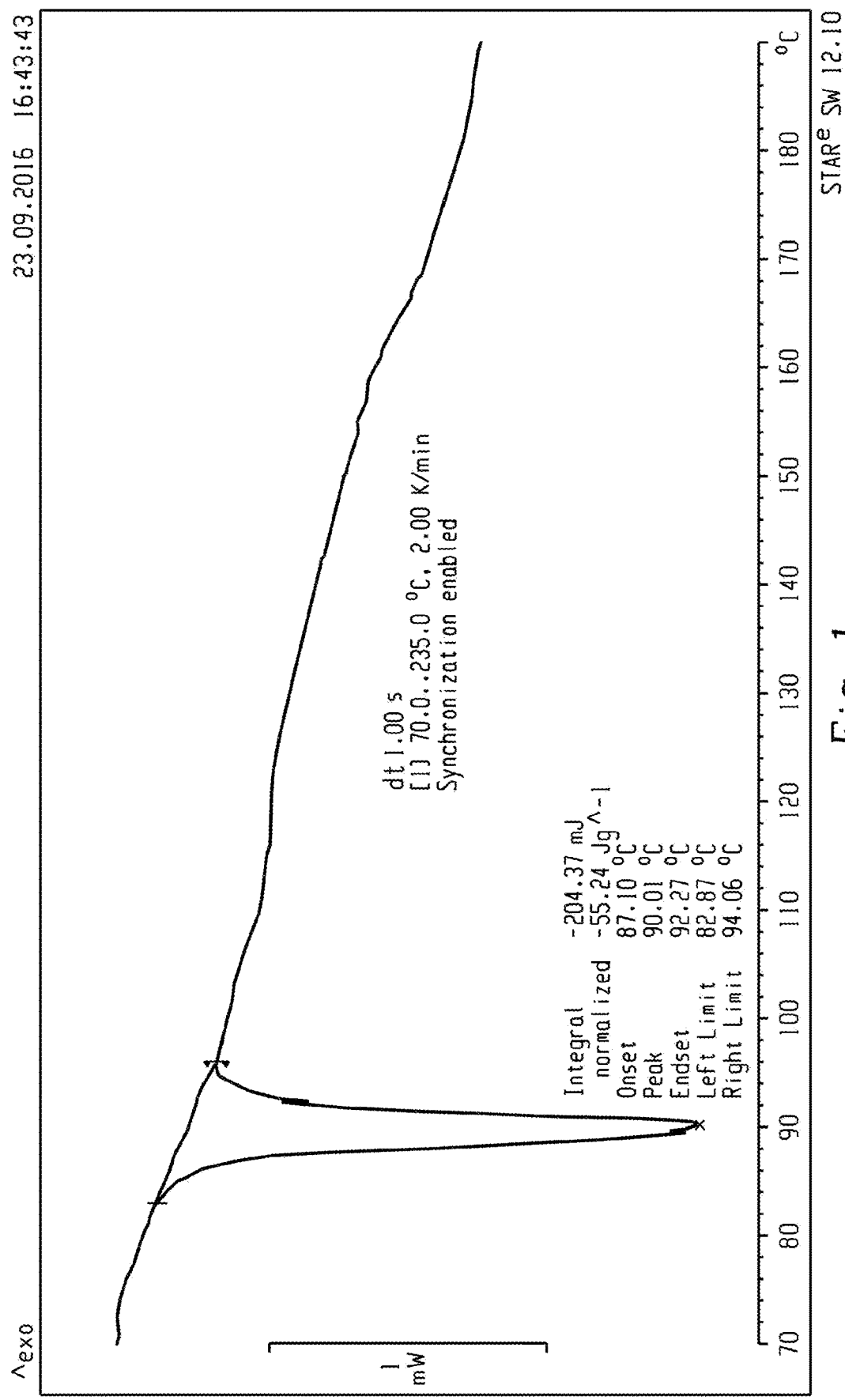
FIG. 1 shows a DSC trace of co-crystal of boscalid and tebuconazole obtained using the process described in Example 1.
Figure 2:
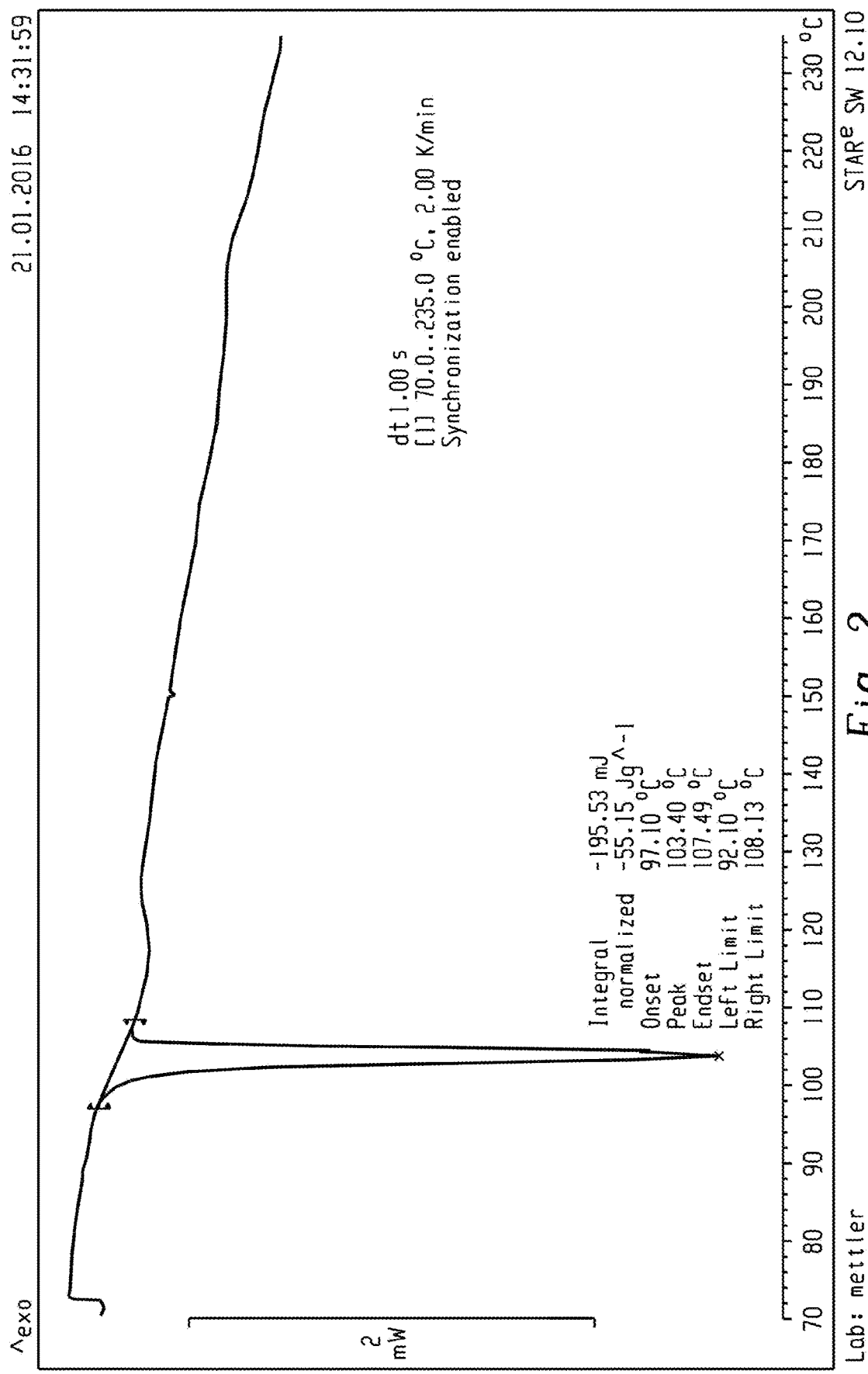
FIG. 2 shows a DSC trace of boscalid and hexaconazole co-crystal obtained using the process described in Example 2.
Figure 3:
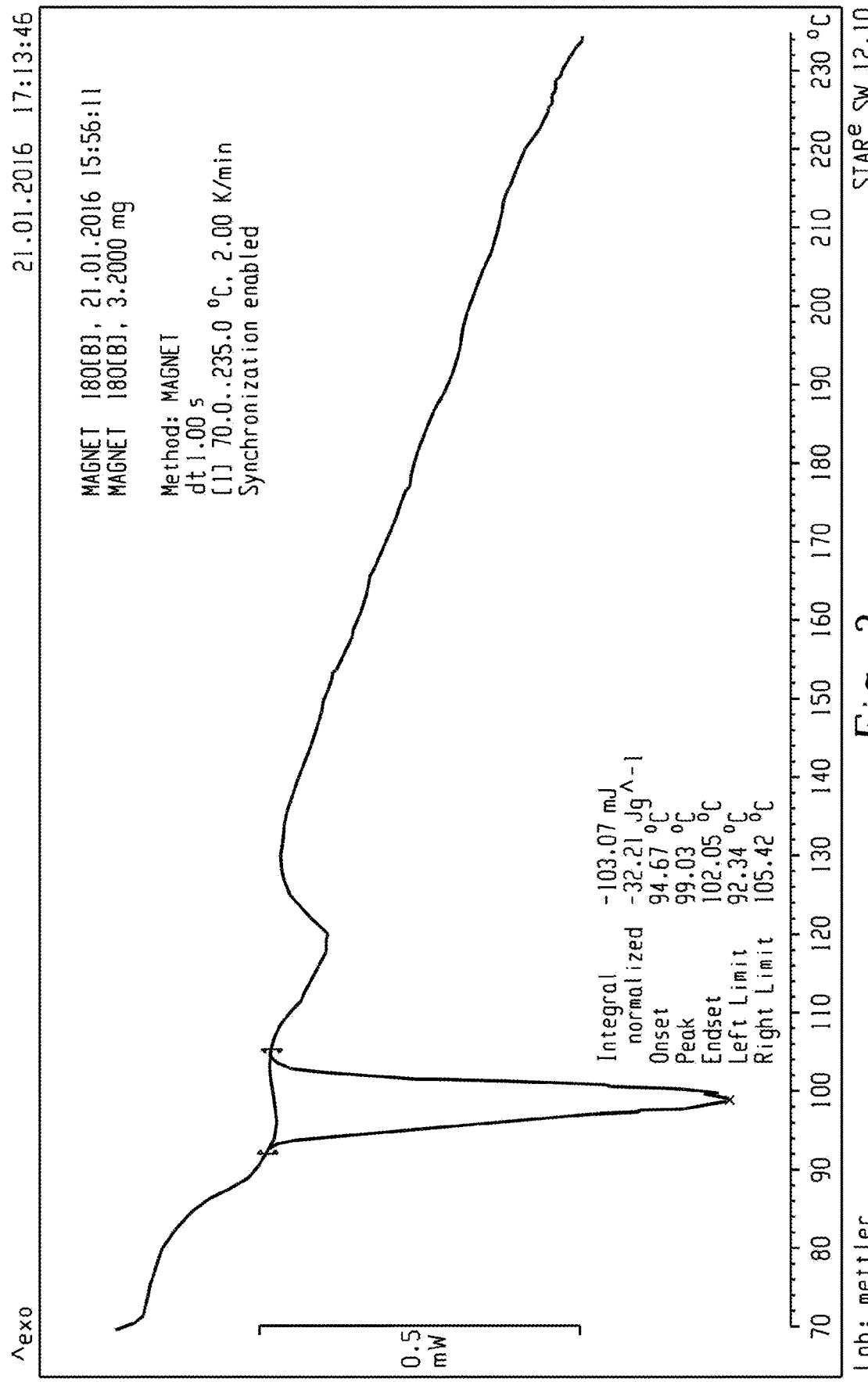
FIG. 3 shows a DSC trace of boscalid and cyproconazole co-crystal obtained using the process described in Example 3.
Figure 4:
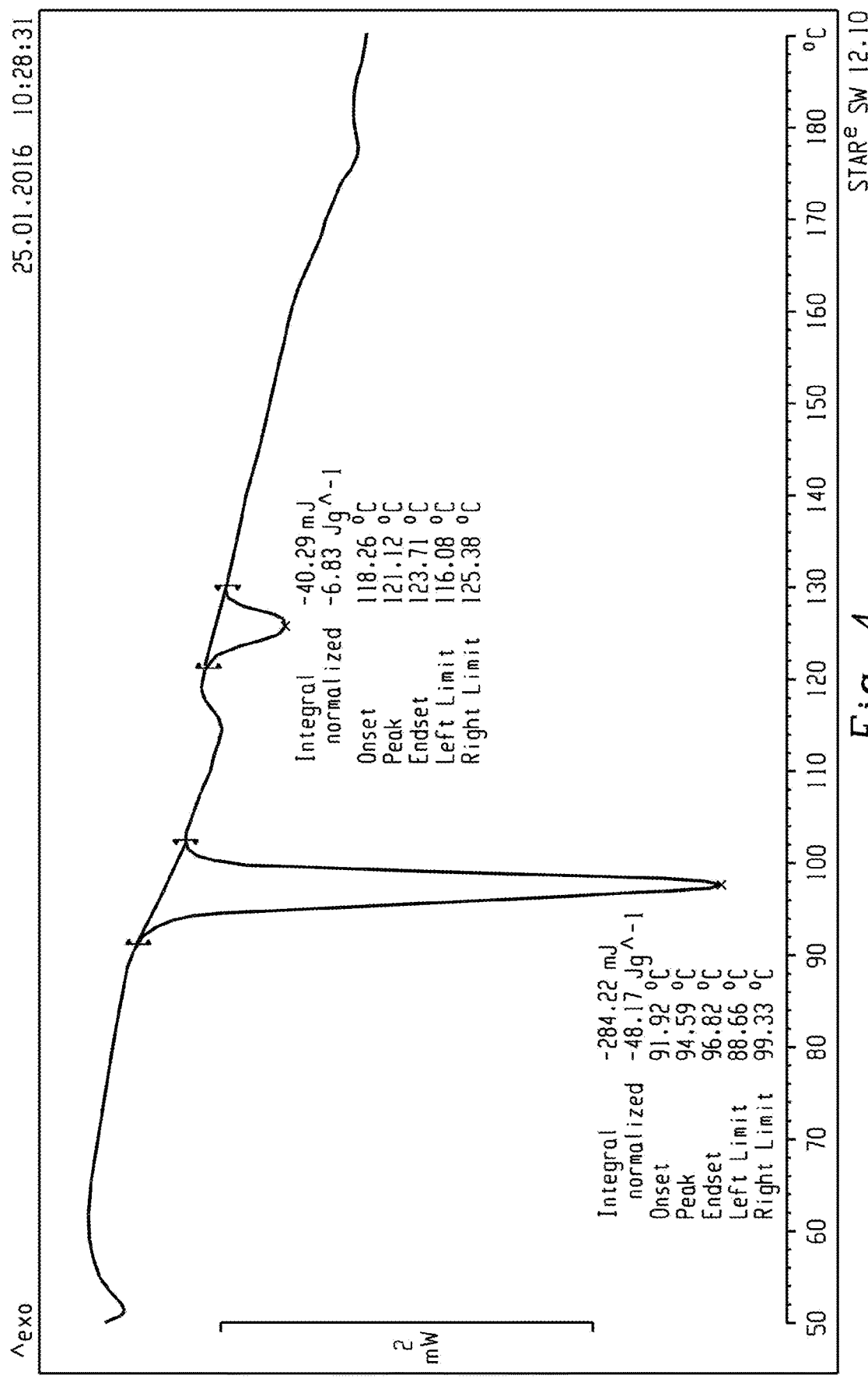
FIG. 4 shows a DSC trace of co-crystal of boscalid and tebuconazole obtained using the process described in Example 7.
Figure 5:
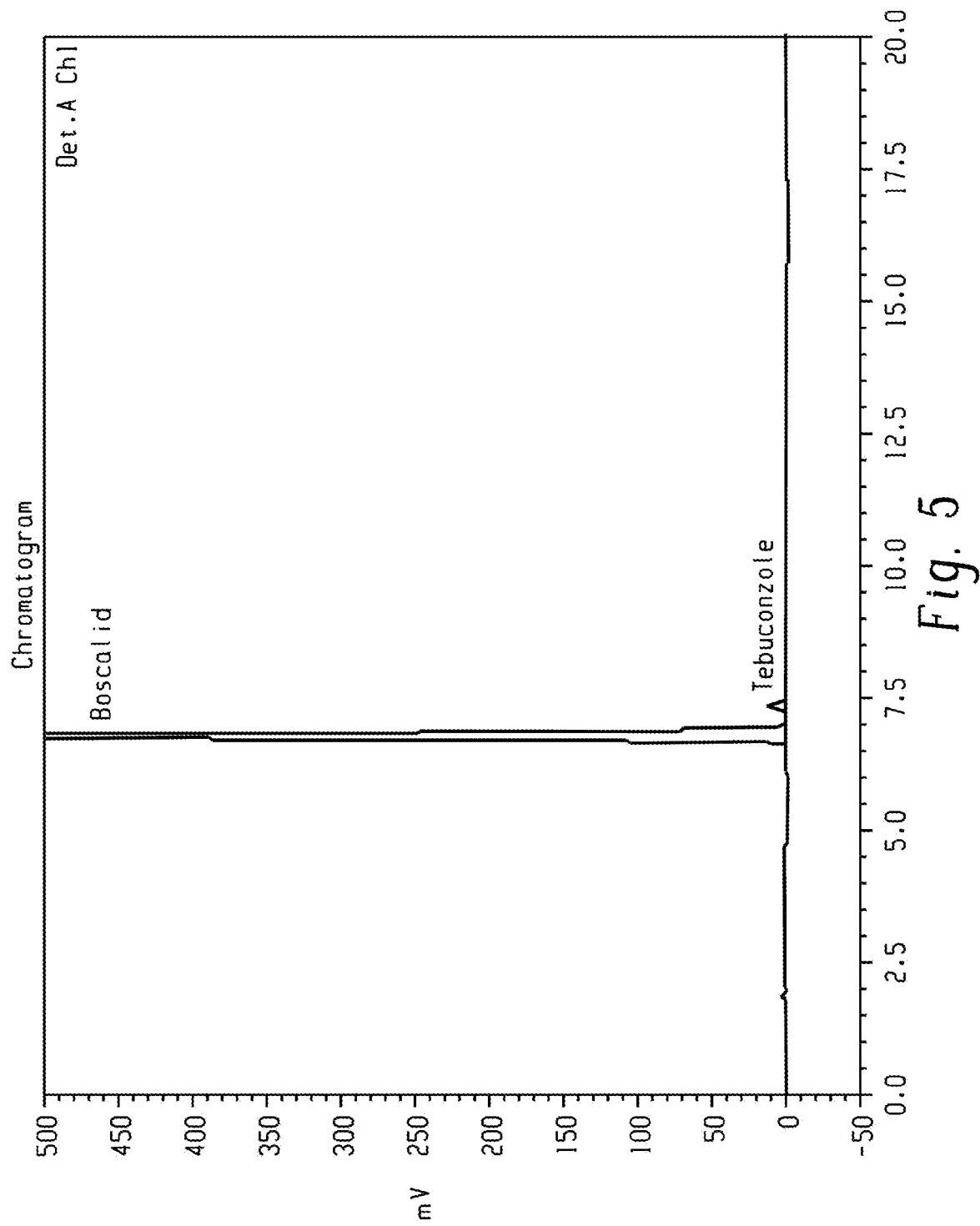
FIG. 5 shows the HPLC chromatogram of co-crystal of boscalid and tebuconazole obtained using the process described in Example 1.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A co-crystal comprising boscalid and hexaconazole, wherein the melting point of the co-crystal is in the range of 101-105° C. when measured with a Differential Scanning calorimeter and has an endothermic peak at 103.40° C.

2. A co-crystal comprising boscalid and cyproconazole, wherein the melting point of the co-crystal is in the range of 97-101° C. when measured with a Differential Scanning calorimeter and has an endothermic peak at 99.03° C.

3. The co-crystal of claim 1, where in the molar ratio of boscalid to hexaconazole is 1:1.

4. An agrochemical composition comprising the co-crystal of claim 1 and an agronomically acceptable excipient.

5. A method of combating or controlling fungi, said method comprising contacting fungi or their locus with a fungicidally effective amount of the co-crystal of claim 2.

6. The co-crystal of claim 2, where in the molar ratio of boscalid to cyproconazole is 1:1.

7. An agrochemical composition comprising the co-crystal of claim 2 and an agronomically acceptable excipient.

8. A method of combating or controlling fungi, said method comprising contacting fungi or their locus with a fungicidally effective amount of the co-crystal of claim 3.

\* \* \* \* \*